Patented June 8, 1937

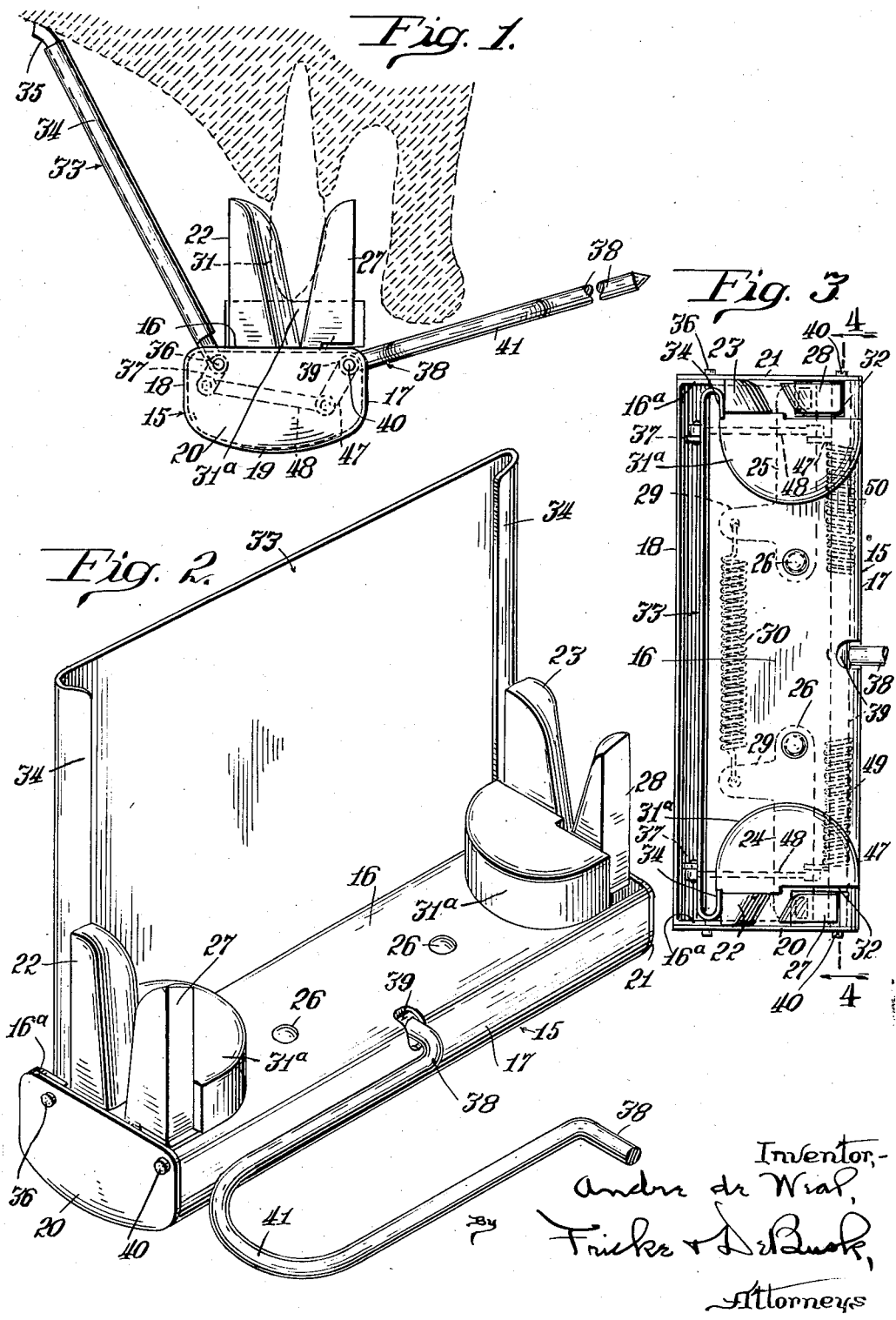

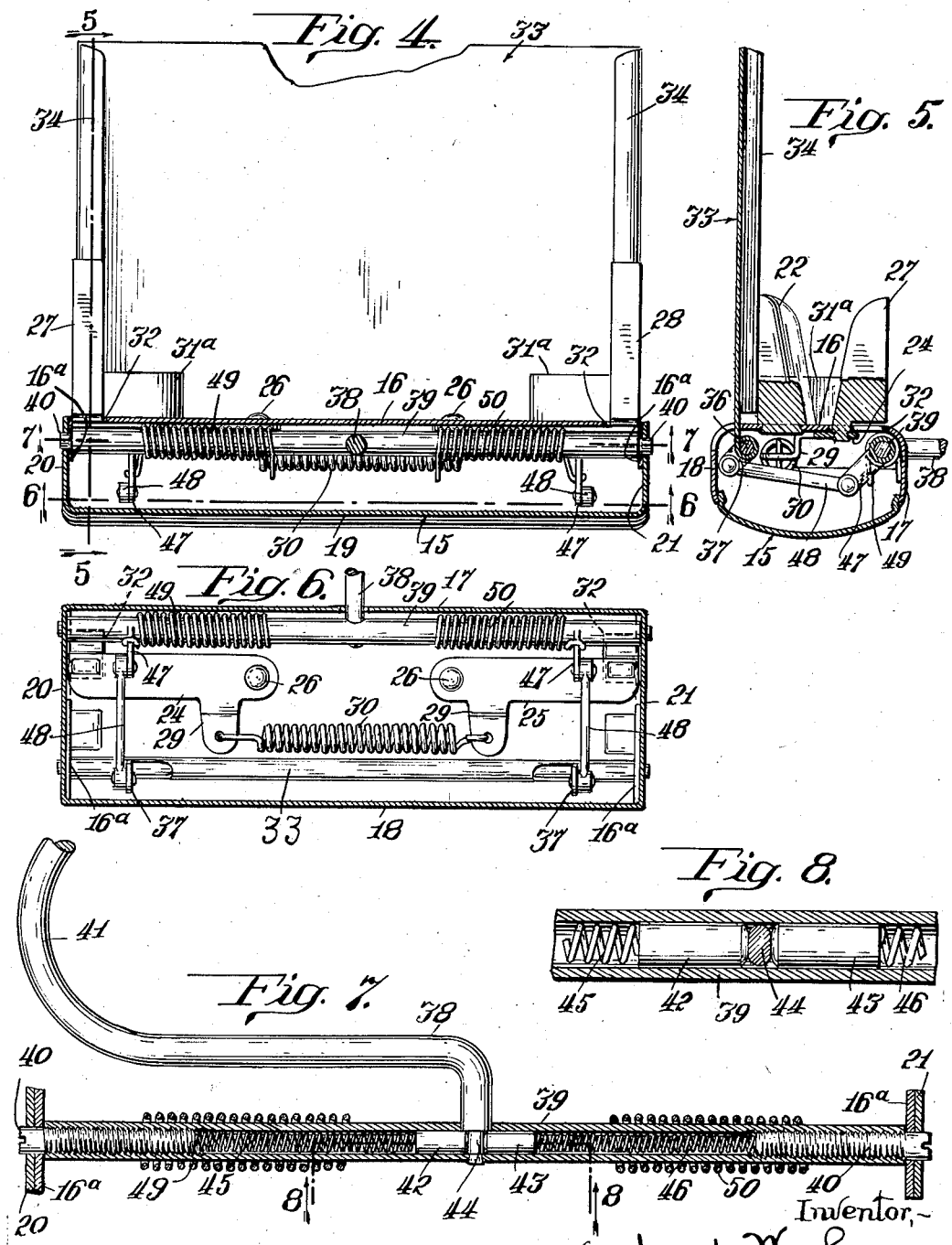

2,082,793

UNITED STATES PATENT OFFICE 2,082,793

DIRECTION INDICATOR FOR X-RAY EXPOSURES

André de Weal, Chicago, Ill.

Application June 11, 1934, Serial No. 729,955

12 Claims. (Cl. 250—34)

My invention relates to direction indicators for dental X-ray exposures and it has for its object the provision of a new and improved form and arrangement of parts for indicating the position in which an X-ray tube should be placed in relation to a tooth or a portion of the jaw of a patient for obtaining on the sensitized film or plate a substantially true sized image of the part being radiographed. To this end, it is one of the objects of my invention to provide an apparatus comprising a base member adapted to be held in a predetermined normal position with respect to a tooth, a movably mounted pointer, and means controlled by the position of the film or other sensitized plate along the inner face of the tooth for indicating the proper position for the X-ray tube for obtaining on the film the desired true sized image.

As is fully understood by those skilled in this art, the conformation of the jaws and palate and the position of the teeth in many mouths are such that it is impossible for a sensitized film to be placed in position along the inner face of a tooth or a row of teeth so as to stand in even approximately parallel position with respect to the teeth. Under such circumstances, unless the position of the tube or other source of ray is very carefully determined and controlled, the image on the developed film will be found to differ substantially in length from that of the tooth being radiographed, and the ratio between length of tooth and length of image will be found to vary to a high degree between different teeth in the same mouth. If the central beam from an X-ray tube is directed at right angles to the plane of the tooth when the film is standing at an angle with respect to the tooth, the resulting image will be found to be elongated. If the central beam of the ray is directed at right angles to the film when the film is standing at an angle with respect to the tooth, the image will be shortened as compared with the length of the tooth. These equally objectionable results can be avoided and a true sized image obtained capable of being easily judged by a dentist by directing the central beam from the tube at right angles to the plane which bisects the angle between the plane of the tooth and the plane of the film, and it has been the effort of skillful operators to accomplish this result. However, for attaining this end, it has been necessary first to establish by inspection an imaginary plane of the tooth, then again by inspection to determine the probable plane of the film as held in position manually by the patient, then to bisect the angle between such two established planes, and lastly to place the tube in such position that the central beam from the tube will strike the bisecting plane at right angles.

It is the object of my invention to provide an apparatus which will with a high degree of success on the average establish mechanically the plane of the tooth and the plane of the film and will mechanically and automatically establish a line which stands definitely at right angles to the plane bisecting the angle between said two planes, leaving practically nothing to guess-work, conjecture, and judgment on the part of the operator.

It is one of the objects of my invention to provide improved means for holding a base member in predetermined normal position with respect to a tooth or a row of teeth, and to provide improved means for mounting and connecting the operating parts in cooperative relation for effecting the desired results. To this end, it is one of the objects of my invention to improve devices of this type in sundry details hereinafter pointed out. The preferred means by which I have accomplished my several objects are illustrated in the accompanying drawings and are hereinafter specifically described. That which I believe to be new and desire to cover by Letters Patent is set forth in the claims.

In the drawings,—

Fig. 1 is an end view of my improved device in position upon a tooth which is indicated diagrammatically by dotted lines along with a diagrammatic representation of a jaw and associated parts in cross section;

Fig. 2 is a perspective view of my improved apparatus;

Fig. 3 is a top plan view of the device;

Fig. 4 is a vertical cross section taken at line 4—4 of Fig. 3;

Fig. 5 is a vertical cross section taken at line 5—5 of Fig. 4;

Figs. 6 and 7 are horizontal cross sectional views taken at line 6—6 and line 7—7 respectively of Fig. 4; and Fig. 8 is a fragmentary view being a section taken at line 8—8 of Fig. 7.

Referring now to the several figures of the drawings, in which corresponding parts are indicated by the same reference characters, 15 indicates a base member or frame-work in the form of a housing comprising a sheet of metal bent into chanel form to provide a top plate 16, a front plate 17, and a back plate 18, as is best shown in Fig. 5. The housing is completed by the provision of a bottom plate 19 also of sheet metal having end plates 20 and 21 formed integrally therewith, the two units of the housing being fitted together and secured to each other by welding or in any other suitable manner, the top plate 16 having downwardly extending flanges 16a at its ends for facilitating such connection.

Upon the upper face of the top plate 16 of the housing, I have mounted lugs 22 and 23 at opposite ends of the device. Upon the inside face of the top plate 16, I have pivotally mounted levers 24 and 25 by means of rivets 26 at the inner ends of the levers, the outer ends of the levers being provided with lugs 27 and 28 positioned opposite to the lugs 22 and 23 respectively. As is best shown in Fig. 6, each of the levers is provided with a rearwardly extending arm 29, the rear ends of which arms are connected together by a coiled spring 30 which serves normally to press the lugs 22 and 27 yieldingly toward each other at one end of the device and to press the lugs 23 and 28 yieldingly toward each other at the opposite end of the device. The arrangement is such that when the device is placed in position upon a tooth such as the tooth 31 as shown in Fig. 1, with the lugs at one end of the device engaging opposite faces of the tooth, and with the tooth engaging a block or spacing member 31a mounted on the outer face of the top plate 16, the base member 15 is held rigidly in a predetermined normal position with respect to the tooth, which in the construction illustrated is such that the top plate 16 is at right angles to the plane of the tooth. As is best shown in Fig. 5, the top plate 16 is provided with slots 32 through which the lugs 27 and 28 extend.

In the form of device as shown in Fig. 2, an arm is employed swingingly mounted on the base member so as to have substantially the same position with respect to the base as that of the film, such arm being in the form of a film holder 33 comprising a sheet of metal having its side edge portions 34 turned inwardly in spaced relation to the body of the holder so as to grip a film 35 having its edge portions inserted underneath the flanges 34, such flanges being adapted normally to hold the film in adjusted position by friction. At its lower edge, the sheet of metal is rolled (see Fig. 5) for grasping a shaft 36 by which the film holder is swingingly mounted upon the base member, the ends of the shaft 36 engaging suitable bearings in the end plates 20 and 21. Near the opposite end portions, arms 37 are provided extending downwardly and backwardly from the lower edge of the film holder, such arms 37 in the arrangement shown being formed integrally with the film holder.

The pointer 38 of my improved apparatus is, in the arrangement shown, in the form of a rod which is mounted at its rear end in a tubular member 39 which is positioned longitudinally of the housing or base member 15, being held in position by means of pins 40 mounted by means of screw threads in the ends of the member 39 and bearing at their outer ends in the end plates 20 and 21 of the housing. The bar 38 in the arrangement shown is revolubly mounted with respect to the tubular rock shaft 39 so as to provide that an offset or bowed portion 41 can be shifted to extend toward either end of the base member. Yielding means is provided for holding the pointer yieldingly in either the adjusted position as shown in Fig. 2 with the bowed portion 41 extending in one direction or with the pointer turned through 180° so as to have the bowed portion extend in the opposite direction. This means comprises two plungers 42 and 43 (see Fig. 8) slidably mounted in the tubular rock shaft 39 and bearing at their inner ends against a flattened portion 44 of the bar 38, the plungers 42 and 43 being pressed yieldingly against said flattened portion 44 by means of coiled springs 45 and 46 which bear at their outer ends against the pins 40.

For connecting the rock shaft 39 with the film holder so as to cause the film holder and the pointer to swing in unison with respect to the base member 15, I have provided arms 47 extending from the tubular rock shaft 39, such arms 47 being preferably welded in position upon the rock shaft. Links 48 are pivotally connected at opposite ends with the arms 37 and 47, the arms 37 and 47 being arranged in such position with respect to the film holder and the rock shaft 39, and the links 48 being of such length, as to insure that when the film holder 33 stands in substantially right angular position with respect to the plate 16 the pointer 38 extends forwardly in substantially horizontal position (see Fig. 5). In the arrangement shown, the arms 47 are of an effective length just double the effective length of the arms 37, with the result that when the film holder 33 is moved backwardly in counter-clockwise direction in Fig. 5 from the position there shown the pointer 38 is swung upwardly through just half as great an angle as that through which the film holder swings backwardly. Inasmuch as the pointer 38 in normal position as shown in Fig. 5 stands at right angles to the plane of the film holder as shown in said Fig. 5, it follows that in any adjusted position of the film holder 33 the pointer 38 stands at right angles to the plane which bisects the angle between the normal position of the film holder and the changed position of the film holder at the end of a swinging movement. Since the film holder 33 in Fig. 5 is parallel to the normal position of a tooth engaged between the gripping lugs as above described, it follows that the pointer 38 at all times indicates the position at which a tube shall be placed for having the ray therefrom delivered at the required angle for producing a true sized image.

For holding the film holder 33 and the pointer 38 yieldingly in normal position as shown in Fig. 5, I have provided coiled springs 49 and 50 upon the rock shaft 39, each of such springs 50 engaging the base member 15 at one end and one of the arms 47 at the opposite end for pressing the arms 47 upwardly and backwardly, serving to hold the pointer 38 in its lowermost position and the film holder 33 at the forward limit of its swinging movement.

When my improved device is to be placed in position upon a tooth, a film 35 is first inserted in the desired adjustment in the film holder. The pointer 38 is adjusted to have the bowed or offset portion 41 extend in the desired direction along the base member 15. The device as a whole is then preferably grasped by the lugs 27 and 28 in such manner that by pressure upon their outer faces at the ends of the device the lugs can be forced forwardly with respect to the lugs 22 and 23 so as to enable the device to be fitted into position upon a tooth as shown in Fig. 1. As the device is being placed in position, the film 35 and film holder 33 are forced backwardly to the necessary extent by engagement with the palate or other portion of the mouth, the film holder serving to hold the film in as nearly as possible parallel position with respect to the plane of the teeth, the film being kept itself in straightened condition by the holder 33.

As the film holder 33 is swung backwardly through a given angle, the pointer 38 is swung upwardly through just half as great an angle whereby the desired relationship is effected definitely by mechanical means independently of calculation on the part of the operator. It is only necessary that the operator be careful that the base member 15 is in normal position with respect to the teeth to be radiographed. If the base member is found to be in slightly angular position with respect to the normal, it can be adjusted manually by the operator to normal position and can be easily retained in the adjusted position by the grip of the teeth of the other jaw on the device. As will be appreciated, by reason of the provision of the bowed or offset portion 41 of the pointer, the device can be applied readily to the back teeth of a patient, the cheek of the patient being received in the open bowed portion 41.

It will be understood that the X-ray tube is not to be placed directly in line with the pointer 38 but is to be placed a short distance above or below the line designated by the pointer corresponding to the middle portion of the film 35 rather than its pivoted edge.

As will be readily understood, the pointer 38 indicates not only the desired vertical position of the X-ray tube but indicates also the vertical plane at right angles to the film through its middle point. By consideration of this feature, the beam is capable of being directed so as to avoid the projection of the image of one tooth upon the image of an adjacent tooth.

By the use of my improved apparatus, an operator is advised as to the normal position for the X-ray tube as an aid in obtaining a special projection from some angle other than the normal if for special reasons such special projection is desired.

While I prefer to employ the form of apparatus as shown in my drawings and as above described, it is to be understood that my invention is not limited thereto except so far as the claims may be so limited by the prior art.

I claim:—

1. In an apparatus of the type described, the combination of a base member, a film support swingingly mounted on said base member for holding a film in exposure position with respect to a tooth of a patient when the base member is gripped between the adjacent teeth of the patient, pointer means pivotally connected with said base member, and linkwork means pivotally connected with said film support and said pointer means actuated by a swinging movement of said film support for causing said pointer means to swing in the same direction circumferentially but through a smaller arc.

2. An apparatus of the type described, comprising in combination an elongated base member, two lugs projecting from the face of said base member at opposite ends thereof, two other lugs movably mounted on said base member opposite said first named lugs respectively, yielding means normally pressing the lugs toward each other at each end of the base member serving when said lugs are positioned at opposite faces of a tooth to hold the base member in fixed position with respect thereto, pointer means pivotally mounted on said base member and extending forwardly therefrom, a film holder pivotally mounted on said base member for supporting a film in position opposite the tooth upon which the base member is mounted and adapted to swing backwardly away from the tooth, and connections between said film holder and said pointer means for causing them to swing in unison and adapted when the film holder is given an angular movement with respect to the base member to cause the pointer means to swing through a substantially smaller angle.

3. An apparatus of the type described, comprising in combination an elongated base member, two lugs projecting from the face of said base member at opposite ends thereof, two levers pivotally connected at their inner ends with said base member, two lugs mounted on the outer end portions of said levers opposite said first named lugs respectively, yielding means acting on said levers for pressing the lugs at each end of the base member toward each other for holding the base member in fixed position with respect to a tooth at opposite faces of which said lugs are positioned, pointer means pivotally mounted on said base member and extending forwardly therefrom, a film holder pivotally mounted on said base member for supporting a film in position opposite the tooth upon which the base member is mounted and adapted to swing backwardly away from the tooth, and connections between said film holder and said pointer means for causing them to swing in unison and adapted when the film holder is given an angular movement with respect to the base member to cause the pointer means to swing through a substantially smaller angle.

4. An apparatus of the type described, comprising in combination a base member adapted to be held by engagement with the teeth of a patient in a predetermined normal position with respect to the teeth, an arm movably mounted on said base member and adapted to have substantially the same angular position with respect to the base member as that of a film in exposure position in the mouth of the patient, pointer means movably mounted on said base member and extending forwardly therefrom adapted to swing vertically with respect to the base member and having a laterally disposed offset portion a short distance in front of the base member adapted to receive the cheek of the patient edgewise therein when the apparatus is used for a radiograph of a back tooth, and means controlled by the position of said arm for regulating the normal position of said pointer means adapted normally to keep the angle through which said pointer means swings substantially smaller than the angle through which the arm swings.

5. An apparatus of the type described, comprising in combination a base member adapted to be held by engagement with the teeth of a patient in a predetermined normal position with respect to the teeth, an arm movably mounted on said base member and adapted to have substantially the same angular position with respect to the base member as that of a film in exposure position in the mouth of the patient, pointer means extending forwardly from said base member and being movably mounted so as to swing vertically with respect to the base member and to turn through an angle of 180° about its own longitudinal axis, said pointer means having a laterally disposed offset portion a short distance in front of the base member adapted to be turned into position opposite either end of the base member for receiving either cheek of the patient edgewise therein when the apparatus is used for a radiograph of a back tooth, and means controlled by the angular position of said arm for regulating the normal position of said pointer means adapted normally to keep the angle through which said pointer means swings substantially smaller than the angle through which the arm swings.

6. An apparatus of the type described, comprising in combination a base member, pointer means pivotally mounted on said base member and extending forwardly therefrom, a film holder pivotally mounted on said base member for supporting a film in substantially perpendicular position with respect to said pointer means and adapted to swing backwardly from such position, means for holding said base member in fixed position with respect to a tooth, an arm projecting downwardly from said film holder to a point slightly below its pivotal axis, an arm projecting downwardly from said pointer means to a point a slightly greater distance below its pivotal axis, and rigid link means pivotally connected with said arms for causing them to swing in unison.

7. An apparatus of the type described, comprising in combination a base member, pointer means pivotally mounted on said base member and extending forwardly therefrom, a film holder pivotally mounted on said base member for supporting a film in substantially perpendicular position with respect to said pointer means and adapted to swing backwardly from such position, means for holding said base member in fixed position with respect to a tooth, an arm projecting downwardly from said film holder to a point slightly below its pivotal axis, an arm projecting downwardly from said pointer means to a point a slightly greater distance below its pivotal axis, and rigid link means pivotally connected with said arms for causing them to swing in unison, the positions of said arms and the length of said link being such that when said film holder stands substantially parallel with said tooth said pointer means stands substantially at right angles to said film holder.

8. An apparatus of the type described, comprising in combination a base member, a rock shaft revolubly mounted in said base member longitudinally thereof, a pointer in the form of a rod connected at one end with said rock shaft and extending forwardly therefrom, a film holder in the form of a metal plate pivotally mounted at its lower edge so as to swing backwardly with respect to the base member, means carried by said plate for holding a film in position thereon, means for holding said base member in fixed position with respect to a tooth, and means differentially connected with said rock shaft and said film holder for causing them to swing in unison and adapted to give said film holder substantially twice as great a swing as that of the pointer.

9. An apparatus of the type described, comprising in combination a base member, a rock shaft revolubly mounted on said base member longitudinally thereof, a pointer in the form of a rod connected at one end with said rock shaft and extending forwardly therefrom, a film holder pivotally mounted on said base member so as to swing backwardly with respect to the base member, means for holding said base member in fixed position with respect to a tooth, connections between said film holder and said rock shaft for causing the film holder and said pointer to swing in unison and adapted to give said film holder a substantially greater angular movement than that of the pointer, and coiled spring means mounted on said rock shaft adapted by engagement with the rock shaft and with said base member to hold said rock shaft turned normally to the limit of its movement in the direction for holding said film holder substantially in perpendicular position with respect to the base member.

10. In an apparatus of the type described, the combination of a base member, a film support swingingly mounted on said base member for holding a film in exposure position with respect to a tooth of a patient when the base member is gripped between the adjacent teeth of the patient, pointer means pivotally connected with said base member, and means differentially connected with said film support and said pointer means actuated by a swinging movement of said film support for causing said pointer means to swing in the same direction circumferentially through a smaller arc and arranged so that when the top face portion of the base member stands in horizontal position with the film support in substantially vertical position the pointer means stands also in substantially horizontal position.

11. In an apparatus of the type described, the combination of a base member, a film support swingingly mounted on said base member for holding a film in exposure position with respect to a tooth of a patient when the base member is gripped between the adjacent teeth of the patient, pointer means pivotally connected with said base member, means actuated by a swinging movement of said film support for causing said pointer means to swing in the same direction circumferentially through substantially half as great an arc, and yielding means serving normally to hold said film support and said pointer means swung to the limit of their movement toward each other with one in substantially right angled position with respect to the other.

12. In an apparatus of the type described, the combination of a base member, a film support movably connected with said base member so as to be movable angularly with respect thereto for holding a film in exposure position with respect to a tooth of a patient when the base member is gripped between the upper and the lower teeth of the patient, pointer means movably connected with said base member so as to be movable angularly with respect thereto, and linkwork means movably mounted between said film support and said pointer means actuated by a swinging movement of said film support for causing said pointer means to swing in the same direction circumferentially but through a smaller arc.

ANDRÉ DE WEAL.